Jan. 30, 1962 J. ELLENBERGER 3,019,314
ELECTRIC MOTOR STARTING SWITCH

Filed March 18, 1959 5 Sheets-Sheet 1

INVENTOR:
JAKOB ELLENBERGER

By *[signature]*

Patent Agent

Jan. 30, 1962   J. ELLENBERGER   3,019,314
ELECTRIC MOTOR STARTING SWITCH
Filed March 18, 1959   5 Sheets-Sheet 2

INVENTOR:
JAKOB ELLENBERGER
By
Patent Agent

Jan. 30, 1962 J. ELLENBERGER 3,019,314
ELECTRIC MOTOR STARTING SWITCH
Filed March 18, 1959 5 Sheets-Sheet 4

INVENTOR:
JAKOB ELLENBERGER

By
Patent Agent

Jan. 30, 1962  J. ELLENBERGER  3,019,314
ELECTRIC MOTOR STARTING SWITCH
Filed March 18, 1959  5 Sheets-Sheet 5
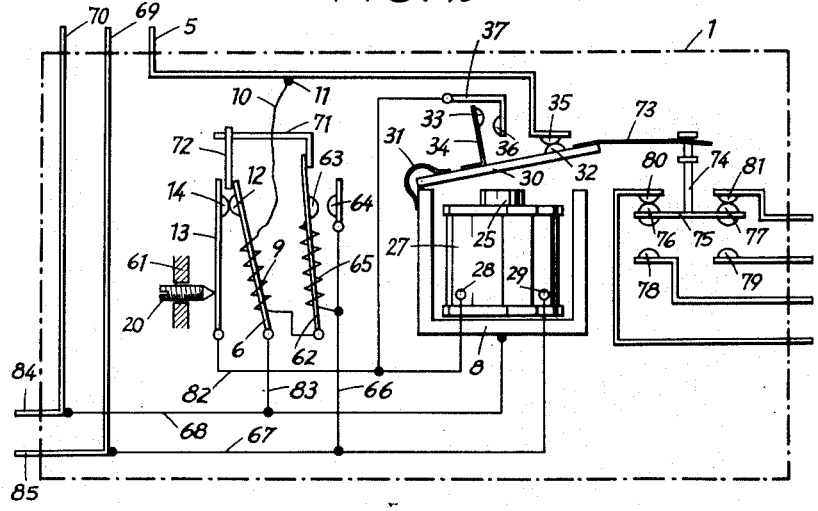
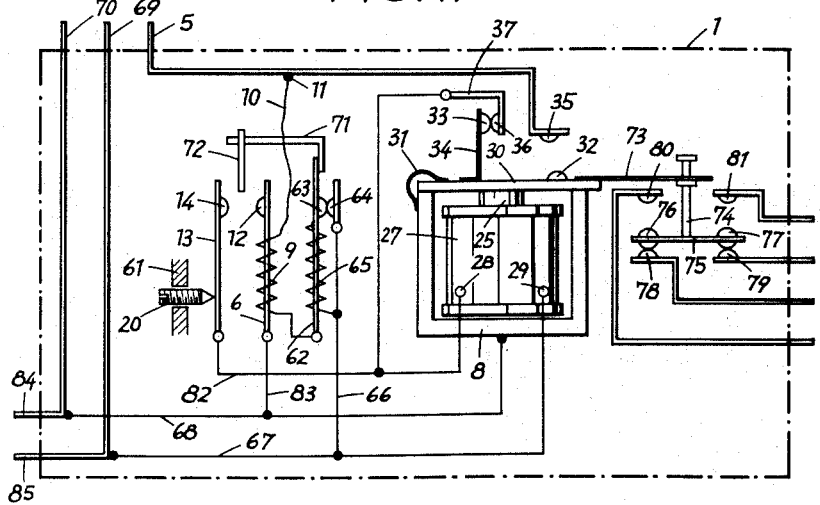
INVENTOR:
JAKOB ELLENBERGER
By
Patent Agent though, and this coil and thus also the bimetallic strip so that the latter will bend and, after the motor has reached its normal operating speed, the contact on the bimetallic strip will disengage from the opposite contact and thereby disconnect the starting circuit. Such a known switch has the disadvantage that the heating coil, which has a relatively high ohmic resistance, causes a voltage drop which reduces not only the voltage in the starting circuit, but also the voltage in the main winding of the motor so that the full torque of the motor will not be available during the starting or during the normal operation thereof. Although the starting circuit will receive the full voltage if the motor is connected to the starting switch so that the bimetallic strip will lie in series with the starting winding, the voltage drop in the heating coil will then reduce the voltage in the main winding of the motor to such an extent that the torque of the motor will be reduced during the operation thereof.

United States Patent Office 3,019,314
Patented Jan. 30, 1962

3,019,314
ELECTRIC MOTOR STARTING SWITCH
Jakob Ellenberger, Altdorf, near Nurnberg, Germany, assignor to Ellenberger & Poensgen G.m.b.H., Altdorf, near Nurnberg, Germany
Filed Mar. 18, 1959, Ser. No. 800,264
Claims priority, application Germany Sept. 26, 1958
21 Claims. (Cl. 200—88)

The present invention relates to an electric switch, particularly a starting switch for electric motors which comprises a bimetallic strip with a heating coil for heating the strip and an electric contact on the bimetallic strip associated with an opposite contact.

In the known kinds of starting switches of this type the heating coil provided on the bimetallic strip is connected at one end to the contact on the strip and thus connected in series therewith. Such switches are connected to the circuit of the electric motor in such a manner that, on the one hand, the heating coil and the bimetallic strip are connected in series with the main winding or windings of the motor and that, on the other hand, the heating coil is connected in series with the starting circuit of the motor through the contact on the bimetallic strip and the opposite contact associated therewith. When the current is switched on, the motor will then start to run since in the cold condition of the bimetallic strip the same is in engagement with the opposite contact. The current flowing through the heating coil will then heat up this coil and thus also the bimetallic strip so that the latter will bend and, after the motor has reached its normal operating speed, the contact on the bimetallic strip will disengage from the opposite contact and thereby disconnect the starting circuit. Such a known switch has the disadvantage that the heating coil, which has a relatively high ohmic resistance, causes a voltage drop which reduces not only the voltage in the starting circuit, but also the voltage in the main winding of the motor so that the full torque of the motor will not be available during the starting or during the normal operation thereof. Although the starting circuit will receive the full voltage if the motor is connected to the starting switch so that the bimetallic strip will lie in series with the starting winding, the voltage drop in the heating coil will then reduce the voltage in the main winding of the motor to such an extent that the torque of the motor will be reduced during the operation thereof.

The known starting switches of this type have the further disadvantage that, after the starting circuit has been disconnected, the bimetallic strip will require a considerable length of time for cooling off sufficiently so that its contact will engage with the opposite contact. Until the bimetallic strip has reached this original position, the motor after being disconnected can, however, not be switched on again. The known bimetallic switches are therefore unsuitable for being used as starting switches for electric motors which have to be switched on or off frequently and rapidly. Such motors are used especially for refrigerating apparatus, for example, electric refrigerating cabinets, in which a very accurate temperature control is to be attained.

It is an object of the present invention to overcome the above-mentioned disadvantages of the known starting switches by connecting the heating coil in parallel to the starting circuit and by providing a relay, the armature of which controls a pair of contacts which lie in series with the starting circuit, as well as a pair of relay holding contacts lying in parallel to the contact on the bimetallic strip and its opposite contact, the coil of which is connected in series with the contact on the bimetallic strip and its opposite contact.

The heating coil of the starting switch according to the present invention is therefore directly connected to the power-supply voltage so that the bimetallic strip will be heated as quickly as possible. Furthermore, the starting circuit is also supplied with the full voltage since in series with the starting circuit there is only a pair of contacts which will be separated when the bimetallic strip has been heated. Thus, when the motor is switched on, it will immediately attain its full torque since the main winding or windings of the motor are also directly connected to the main power line. The circuit arrangement according to the present invention has the further advantage that, as soon as the contact on the bimetallic strip engages with the opposite contact, the relay coil will be energized so that, on the one hand, the pair of contacts which lie in series with the starting circuit will be opened and, on the other hand, the holding contacts will be closed. Since the holding contacts lie in parallel to the contact on the bimetallic strip and its opposite contact, and the heating coil will be deenergized when the pair of contacts which lie in series with the starting circuit are opened, the bimetallic strip may cool off after the starting circuit has been switched off and may return to its original position so that, when the motor is switched off and again switched on immediately thereafter, the entire mechanism will again be immediately ready for operation.

In order to attain a simple and compact switch construction, the present invention provides that one of the contacts of the pair which is connected in series with the starting circuit is secured to the relay armature so that, when the relay coil is energized, these contacts will be separated and the starting circuit will be switched off. Another feature of the invention consists in also mounting on the relay armature one of the contacts of the pair of relay holding contacts. When the relay armature is then attracted, the circuit of the relay coil will be closed by this pair of holding contacts so that the relay armature will remain in the attracted position, while the pair of contacts which lies in series with the starting circuit will be opened and the starting circuit will be disconnected.

In order to produce a good electric connection between the relay armature and the ferromagnetic jacket of the relay, the invention further provides the armature to be pivotably connected to the iron jacket by a bronze spring or the like.

Another object of the invention is to provide suitable means for adjusting the length of time required for the starting operation. For this purpose the invention provides the contact which is associated with the contact on the bimetallic strip to be secured to a spring which may be adjusted by a setscrew. For adjusting this spring in a simple manner, the setscrew is provided with a conical portion with which the spring engages under its resilient pressure. The spring itself preferably consists of a bimetallic strip in order to compensate for the effect of the surrounding temperature. A very simple compact arrangement may be attained by securing the bimetallic strip directly on the iron jacket of the relay.

If with a switch according to the invention as above described the motor is switched on and off at frequent intervals, it may occur that, after the motor has started to run and the contact on the main bimetallic strip has not as yet disengaged from its opposite contact or has only disengaged therefrom to a slight extent, the motor will be switched off and shortly thereafter be again switched on. The main bimetallic strip will be still quite warm when the motor is switched off and its contact will therefore only be spaced at a very small distance from the opposite contact. Since the full heating current will then flow through the heating coil when the motor is again switched on, the bimetallic strip will bend very quickly so that its contact will just as quickly engage with the opposite contact and the starting winding together with the starting condenser will be switched off. The length of time between the moment at which the starting circuit is switched on and the moment at which it is switched off may then be so short that a proper starting of the motor may not be possible and the motor will fail to function properly.

In order to ensure a proper starting of the motor when the same is switched on and off at frequent intervals, the invention further provides the heating coil with a compensating resistance which is short-circuited until the bimetallic strip assumes a certain curved configuration at which the contact carried by the bimetallic strip does not yet engage the contact with which it cooperates, i.e., is spaced from this contact a certain predetermined distance. When the bimetallic strip assumes this certain curved configuration, the compensating resistance is switched into the circuit of the heater winding. The resistance thus reduces the heating current and slows down the further deformation of the bimetallic strip, so that the contact carried by the bimetallic strip does not engage the opposite contact and, therefore, does not shut off the starting current until the motor has reached its normal operating speed. Therefore, after each equal delay, the contact on the bimetallic strip and its opposite contact will always be closed and the starting circuit be thereby switched off, regardless of whether the bimetallic strip is cold or heated when the motor is switched on. There will thus be no difference in the length of time of the switching function whether the bimetallic strip is in a cold or preheated condition.

For automatically switching the compensating resistance on and off, the invention further provides parallel to such resistance a pair of contacts, one of which is mounted on a spring which is bent in accordance with the movement of the bimetallic strip when the same is being heated by the heating coil and when the contact carried by the bimetallic strip has reached a predetermined distance from the contact with which it cooperates. This spring may be connected to the bimetallic strip by a carrier member which may, for example, be secured to the spring and be provided with a stop member against which the bimetallic strip is adapted to engage and which is preferably made adjustable.

The bimetallic strip is preferably adjusted so that, when it is in the cold condition, it will be disposed at a predetermined distance from the stop member on the carrier member. Thus when the bimetallic strip is being heated from its cold condition, the compensating resistance will not be connected into the circuit and the heating current for the bimetallic strip will thus not be reduced until a certain predetermined length of time has expired. Since the full heating current will thus flow for a greater length of time, it will be possible to heat up the bimetallic strip more quickly from its cold condition. This length of time is determined by the distance between the bimetallic strip and the stop surface on the carrier member. In order to save in space and to simplify the manufacture of the switch, the compensating resistance is preferably wound upon the spring and one end of the resistance is connected to the spring contact.

Since the heated bimetallic strip should act upon the carrier member to bend the spring and thereby to connect the compensating resistance, the bimetallic strip must be able to produce a certain force which has to be quite considerable when the contact on the strip approaches the opposite contact, since the strip then also has to overcome the restraining action of the spring. In order to relieve this load upon the bimetallic strip, the spring may also be made of bimetal and the compensating resistance may be made in the form of a heating coil surrounding the spring. This bimetallic spring will then also bend when heated by this heating coil so that, on the one hand, the main bimetallic strip will be relieved of the load of the spring and, on the other hand, the contacts lying in parallel with the compensating resistance will be held open.

For indicating the position of the relay armature, the switch according to the invention may be provided with signal contacts which will be closed in accordance with the position of the relay armature. For this purpose, the relay armature may carry a control bridge which is adapted to engage with and close the signal contacts.

A further feature of the invention resides in the provision of a housing which preferably consists of two parts and encloses all of the switch elements. The terminal strips of the switch preferably extend from the housing at the joint between the two parts thereof, although in order to save in space they may also be passed through the upper side of the cover of the housing.

The switch according to the invention only requires three terminal strips, one of which is connected to the bimetallic strip, the second to one end of the relay coil, and the third to one of the contacts of the pair which lies within the starting circuit.

The manufacture of the switch may be considerably simplified by providing suitable apertures and recesses in at least one part of the housing into which the various switch elements may be easily inserted and be held in their required position by the other housing part. Such a structure will simplify especially the assembly of the switch and also facilitate any inspection or repairs that might be required.

These and other objects, features, and advantages of the present invention will be further apparent from the following detailed description thereof, particularly when read with reference to the accompanying drawings, in which—

FIGURE 10 shows the circuit diagram according to FIGURE 9 in another operating position; while FIGURE 11 shows the circuit diagram according to FIGURE 9 in still another operating position.

Figure 1:
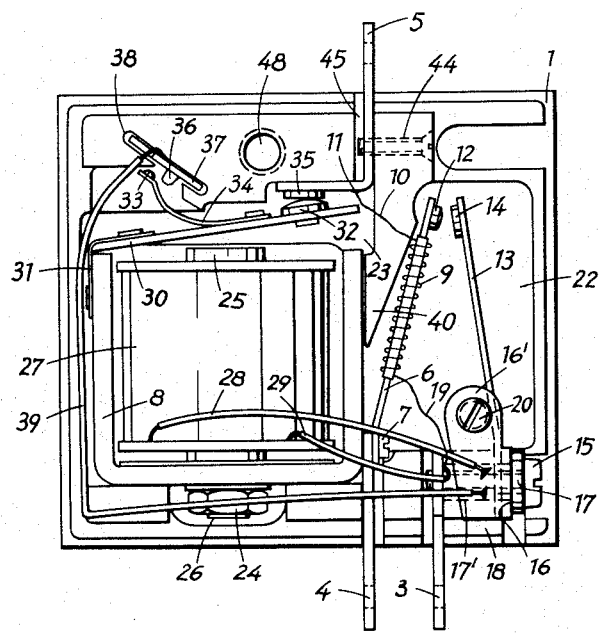
FIGURE 1 shows a plan view of the new switch without the cover.
Figure 2:
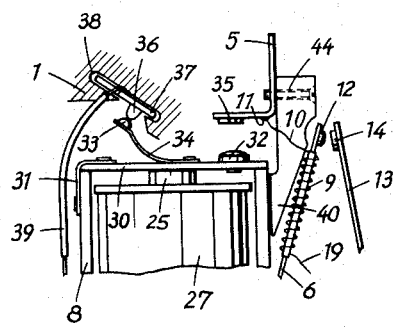
FIGURE 2 shows a fraction of FIGURE 1 with the relay armature in the attracted position.
Figure 3:
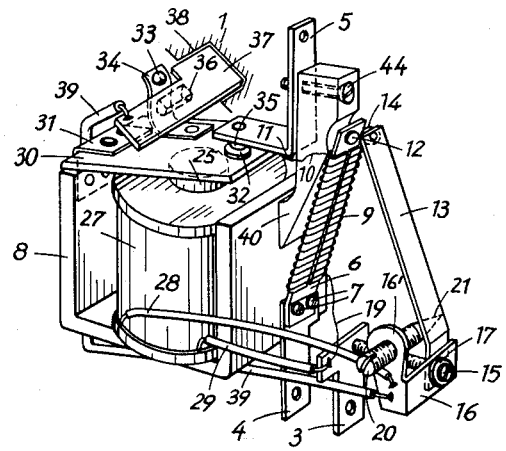
FIGURE 3 shows a perspective view of the switch according to FIGURE 1, but entirely without the housing.
Figure 4:
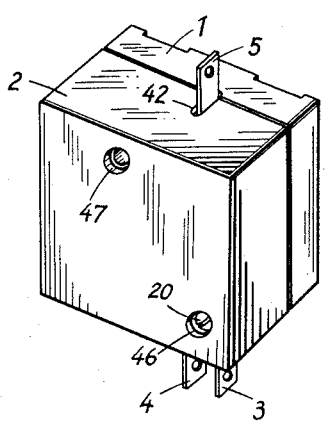
FIGURE 4 shows a perspective view of the switch according to FIGURE 1 fully enclosed within the housing.
Figure 5:
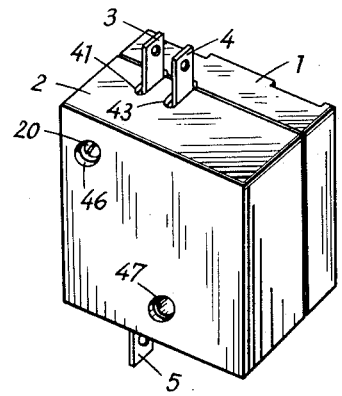
FIGURE 5 shows a perspective view of the switch similar to FIGURE 4, but in the upside-down position.

Referring to the drawings, and first particularly to FIGURES 1 to 5, the switch according to the invention comprises a housing 1 with suitable apertures and recesses therein into which the individual switch elements are inserted and then held therein in their proper position by a cover 2. Housing 1 also has suitable apertures in two opposite side walls thereof for inserting terminal strips 3, 4, and 5. Terminal strip 4 and a bimetallic strip 6 are together rigidly secured by means of screws 7 directly to a ferromagnetic jacket 8 of a relay. Bimetallic strip 6 is surrounded by a heating coil 9, the upper end 10 of which is secured to the angular terminal 5 at 11. At its free end, bimetallic strip 6 has a contact 12 which is operatively associated with an opposite contact 14 on one end of a spring 13 which may consist of bimetal in order to compensate for the surrounding temperature and eliminate the effect thereof. At its lower end, spring 13 has a bore for the insertion of a screw 15. Between the head of screw 15 and spring 13, the screw also carries an angular sheet-metal bracket 16 and a washer 17 of insulating material. Screw 15 is inserted through a bore in a web portion 18 of housing 1 and screwed into a threaded bore in terminal strip 3 which thus serves as a nut for screw 15. When screw 15 is tightened, this terminal strip 3 as well as spring 13 and bracket 16 will be secured in the position shown in FIGURES 1 and 2. The insulating washer 17 and an insulating sleeve 17' on screw 15 will insulate spring 13 and bracket 16 from the screw and thus also from terminal strip 3 to which the screw is secured. The lower end 19 of heating coil 9 is secured to terminal strip 3.

Bracket 16 has an arm 16' extending parallel to the inner base surface of housing 1. A grub screw 20 is screwed into this arm 16' and has a conical end portion 21, as shown particularly in FIGURE 3, which is adapted to engage with the front edge of spring 13 so that when screw 20 is turned in one or the other direction, spring 13 will be pivoted in a clockwise or counterclockwise direction, whereby the distance between the two contacts 12 and 14 will be increased or reduced. In order to permit an unrestricted movement of the bimetallic strip 6 and spring 13, housing 1 is provided with a suitable recess 22.

The iron jacket 8 with the relay coil 27 thereon is inserted into a recess 23 in housing 1 and held in a fixed position therein by the cover 2. As illustrated in FIGURE 1, the relay core 25 which has screw threads 26 at its lower end and carries the relay coil 27 is secured to jacket 8 by a nut 24. One end 28 of coil 27 is secured to bracket 16 and the other end 29 to terminal strip 3. A relay armature 30 is pivotably connected to jacket 8 by means of an angular leaf spring 31 of bronze, one arm of which is riveted to armature 30 and the other arm to jacket 8. Armature 30 has on its upper side a contact 32 and also carries a spring 34 with a contact 33 thereon. Contact 32 is operatively associated with a stationary contact 35 on terminal strip 5, while contact 33 is associated with a stationary contact 6, which is secured to a metal strip 37 which is inserted into a corresponding recess 38 in housing 1 and held in a fixed position by housing cover 2. A conductor 39 electrically connects the metal strip 37 with the metal bracket 16. A web 40 which is integral with housing 1 prevents the iron jacket 8 from shifting laterally in housing 1.

Housing 1 and cover 2 are preferably molded of plastic material. For the passage of terminal strips 3, 4, and 5, cover 2 is provided with recesses 41, 42, and 43. Terminal strip 5 is inserted into an aperture 45 in housing 1 and secured in the position shown in FIGURE 1 by a screw 44 which is mounted in a web of housing 1 and screwed into a threaded bore in strip 5.

The cover 2 has an opening 46 in line with grub screw 20 through which a screw driver may be inserted to adjust the screw. Cover 2 and housing 1 further have bores 47 and 48 in line with each other for receiving a rivet, preferably a hollow rivet, for securing cover 2 to housing 1.

The operation of the switch according to FIGURES 1 to 5 will now be described with reference to FIGURES 6 to 8.

The ends 49 and 50 of lines 51 and 52 are connected through a main switch, not shown, to a source of alternating current, not shown, for example, the main power line. Line 51 leads to one end 53 and 54 of a pair of main windings 55 and 56 of an electric motor which are connected in parallel, while the other end 57 and 58 of the main windings 55 and 56 is connected to line 52 and also to the starting winding 59 of the motor. This starting winding 59 is connected in series with a starting condenser 60 which is connected to terminal strip 5. Line 51 is also connected to terminal strip 4, and line 52 to terminal strip 3.

Figure 6:
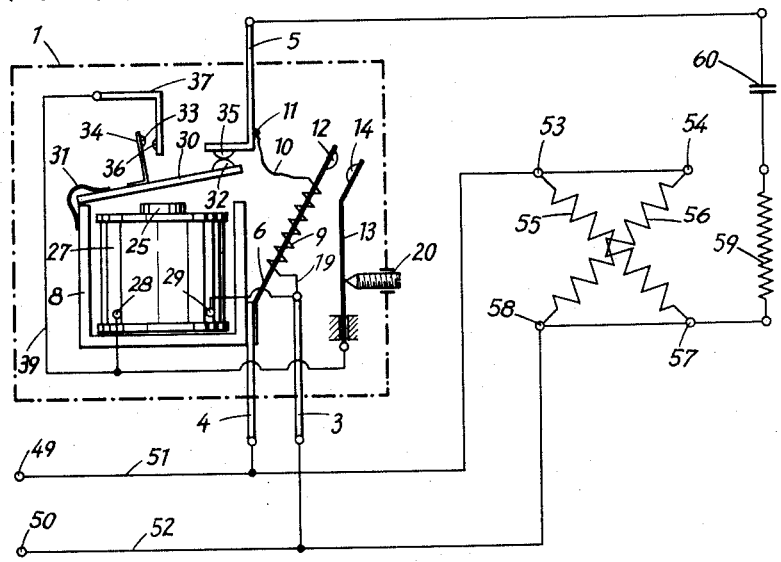
FIGURE 6 shows a circuit diagram of the switch according to the invention connected to an electric motor.
Figure 7:
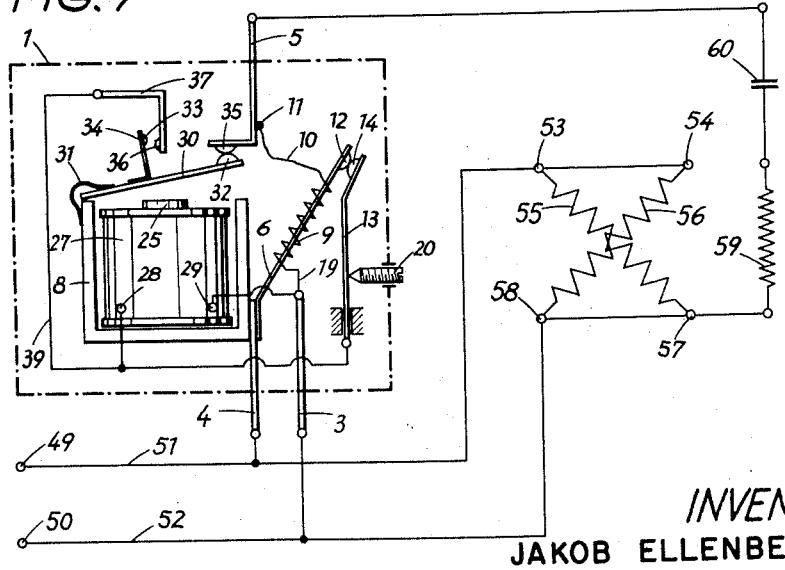
FIGURE 7 shows the circuit diagram according to FIGURE 6 in the position in which the contact on the bimetallic strip engages its opposite contact.

Before the main switch, not shown, which may be automatically controlled, for example, by a thermostat, is closed, all switch elements will be in the position illustrated in FIGURE 6. When the main switch is closed, the current will flow through the main motor windings 55 and 56 which receive the full main supply voltage through lines 51 and 52 and, on the one hand, through the starting winding 59 and the condenser 60 via line 51, strip 4, iron jacket 8, relay armature 30, and contacts 32 and 35, and, on the other hand, via line 52, and it will also flow through the heating coil 9, on the one hand, via line 52 and terminal strip 3 and, on the other hand, via line 51, terminal strip 4, iron jacket 8, relay armature 30, contacts 32 and 35, and terminal strip 5. Thus, the electric motor will start to run and the bimetallic strip 6 will also be heated and bent so that, after the operating speed of the motor is reached, the contact 12 on the bimetallic contact 12 will engage with the opposite contact 14 on spring 13, as illustrated in FIG. 7. As soon as the two contacts 12 and 14 are connected, the relay coil 27 will be energized so that the relay armature 30 will be attracted and be moved from the position as shown in FIGURES 6 and 7 to the position shown in FIGURE 8. In this position, contacts 32 and 35 which lie in series with the starting circuit 59 and 60 are separated from each other so that the starting circuit 59, 60 will be disconnected and heating coil 9 will be deenergized. At the same time, when relay armature 30 is being attracted, the pair of holding contacts 33, 36 will be closed so that the current will flow to relay coil 27 through these holding contacts which lie in parallel connection to contact 12 on the bimetallic strip 6 and its opposite contact 14. Strip 6 will then no longer be heated by heating coil 9 and will cool off. It will then return to the original position shown in FIGURES 6 and 8.

Figure 8:
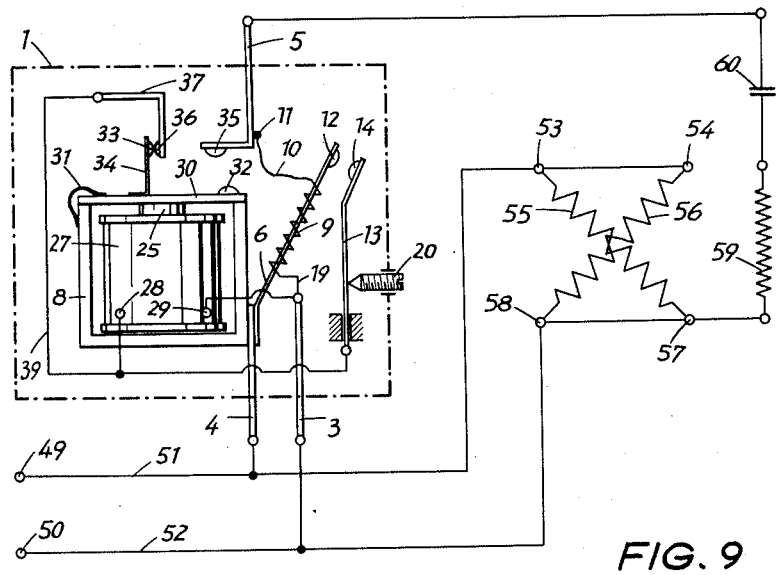
FIGURE 8 shows the circuit diagram according to FIGURE 6 with the relay armature in the attracted position.

When the main switch is opened, relay coil 27 will become deenergized so that under the action of the bronze spring 31 relay armature 30 will snap back from the position shown in FIGURE 8 to the position shown in FIGURE 6 in which contacts 32 and 35 are closed and holding contacts 33 and 36 are opened. Thus, all of the switch elements have returned to the original position shown in FIGURE 6.

Figure 9:
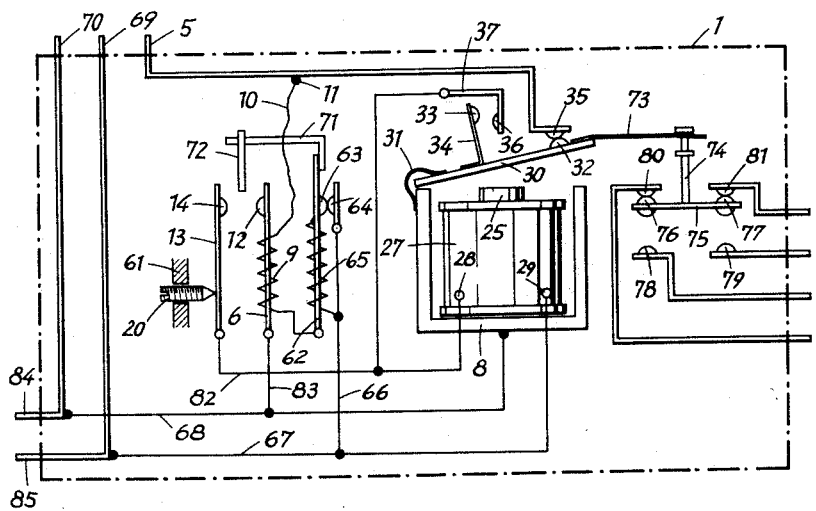
FIGURE 9 shows a circuit diagram of a switch according to a modification of the invention.

The switch according to the modification of the invention as shown in FIGURES 9 to 11 is likewise provided with a bimetallic strip 6 which carries a heating coil 9, the upper end 10 of which is secured to the terminal strip 5. Contact 12 on the bimetallic strip 6 is operatively associated with an opposite contact 14 on a spring 13. For adjusting this spring 13, the switch is likewise provided with a setscrew 20 which is screwed into a stationary part 61 and also has a conical tip which engages with spring 13. For compensating the surrounding temperature and eliminating its effects, spring 13 may also consist of bimetal.

The lower end of heating coil 9 of the bimetallic strip 6 is connected to a spring 62 which carries a contact 63 which, according to FIGURE 9, engages with a stationary contact 64. A compensating resistance 65 wound around spring 62 is connected with one end to contact 63 and with the other end to the stationary contact 64. These two contacts 63 and 64 permit the compensating resistance 65 to be short-circuited. The stationary contact 64 is connected through a line 66 with line 67 which is connected to the terminal strip 85. Terminal strip 84 is connected to a line 68. A main switch, not shown, is connected between lines 67 and 68 and a source of current, not shown, and adapted to switch the electric motor on and off which is connected to terminal strips 5, 69, and 70. The main windings of the motor are then connected to terminal strips 69 and 70, while the starting circuit is connected to terminal strips 5 and 69.

The upper end of spring 62 has an angular bracket 71 with a stop member 72 thereon which is preferably adjustable and serves as a carrier for taking along the bimetallic strip 6.

Spring 62 may also consist of bimetal, and compensating resistance 65 may be wound around this spring to serve as a heating coil for heating up the spring.

The switch as illustrated in FIGURES 9 to 11 is likewise provided with a relay coil 27 which is surrounded by a ferromagnetic jacket 8. The core of the relay is likewise indicated at 25. A bronze spring 31 pivotably connects the relay armature 30 to the iron jacket 8. Aside from the contacts 32 and 33 which are operatively associated with the stationary contacts 35 and 36, respectively, armature 30 also carries on its free end a leaf spring 73, with a bore in its outer end in which a control rod 74 of insulating material is slidably mounted. This control rod 74 is rigidly connected at its lower end to a control bridge 75 which has a pair of contacts 76 and 77 on each side and is adapted to shunt either the stationary contacts 78 and 79, as shown in FIGURE 11, or the stationary contacts 80 and 81, as shown in FIGURES 9 and 10, depending upon the position of armature 30. These contacts 78 to 81 may be connected to signal circuits containing optical and/or acoustical signaling devices.

One end 28 of relay coil 27 is connected through a line 82 to spring 13, and the other end 29 to line 67. The bimetallic strip 6 is connected through a line 83 to line 68.

The bimetallic switch according to FIGURES 9 to 11 differs therefore from the switch according to FIGURES 1 to 8 by the provision of the compensating resistance 65 and the short-circuit contacts 63 and 64. The signal contacts 78 to 81 shown in the switch according to FIGURES 9 to 11 may also be provided in the switch according to FIGURES 1 to 8 so that in this respect the two switches may be made alike. The switch according to FIGURES 1 to 8 further differs from that according to FIGURES 9 to 11 in that the former has three terminal strips 3, 4, and 5, while the latter has five terminal strips 5, 69, 70, 84, and 85, aside from the terminal strips for the signal circuits which, if desired, may also be provided in the switch according to FIGURES 1 to 8. Of course, the switch according to FIGURES 9 to 11 may also be provided with only three terminal strips similarly as the switch according to FIGURES 1 to 8. However, the provision of five terminal strips has the advantage that each of the connecting lines leading to the source of current or to the main switch and to the electric motor, respectively, may be separately connected to a terminal strip of the switch so that no cross connections outside of the switch will be necessary. Terminal strip 5 is connected to the starting condenser 60, and terminal strip 69 to starting winding 59 and the main motor windings 55 and 56, while the other end of the main windings 55 and 56 is connected to terminal strip 70.

The operation of the switch according to FIGURES 9 to 11 is as follows:

Before the electric motor which is connected to terminal strips 5, 69, and 70 is started, the switch elements will be in the position as illustrated in FIGURE 9. When the main switch, not shown, is being closed, the main motor windings 55 and 56, which are shown in FIGURES 6 to 8 but not in FIGURES 9 to 11, are connected to the main supply voltage so that the full current will flow therein which is determined by the supply voltage and the total resistance of these windings. At the same time, however, the starting circuit consisting of the starting winding 59 and the starting condenser 60 (FIGURES 6 to 8) is supplied with current, on the one hand, through the terminal strip 84, line 68, iron jacket 8, relay armature 30, contacts 32 and 35, and terminal strip 5 and, on the other hand, through terminal strips 85 and 69. Furthermore, the heating coil 9 is energized through line 67, the connecting line 66, the stationary contact 64, spring contact 63, and spring 62 so that the bimetallic strip 6 according to FIGURES 9 to 11 will be heated and will thereby bend in a counterclockwise direction until its upper end will engage with the stop member 72 on the angular bracket 71 on spring 62. The further counterclockwise bending movement of the bimetallic strip 6 will then be transmitted through stop member 72 and bracket 71 to spring 62 so that the latter will be bent in the same direction and its contact 63 will separate from the stationary contact 64 whereby the compensating resistance 65 will be connected into the circuit of heating coil 9 so that the current flowing through the latter will be reduced. This reduction of the heating current causes the further bending of the bimetallic strip 6 to proceed more slowly. During this slower movement of strip 6, its contact 12 will engage with contact 14 on spring 13 so that the current will flow to relay coil 27 to energize the same. The position of the bimetallic strip 6 in which its contact 12 engages with contact 14 is illustrated in FIGURE 10. The relay will then attract the relay armature 30 so that the latter will move to the position shown in FIGURE 11 in which the contacts 32 and 35 are separated and the relay holding contacts 33 and 36 are closed. The relay coil 27 will then continue to be energized, on the one hand, through terminal strip 85 and line 67, and, on the other hand, through terminal strip 85, line 68, iron jacket 8, relay armature 30, and relay holding contacts 33 and 36. Since contacts 32 and 35 are separated, both the starting circuit and the heating coil 9 will be deenergized so that the bimetallic strip 6 can cool off and return to the position as illustrated in FIGURE 11. The bimetallic strip 6 will thus also disengage from the stop member 72 on bracket 71 so that spring 62 can bend back and its contact 63 will engage with the stationary contact 64. Also, while in the position according to FIGURE 10 the contact bridge 75 shunts the signal contacts 80 and 81 when it is moved by relay armature 30 to the position according to FIGURE 11, it will instead shunt the signal contacts 78 and 79.

When the main switch is opened, relay coil 27 will be deenergized so that under the action of bronze spring 31 the relay armature 30 will swing back from the position according to FIGURE 11 to the position shown in FIGURE 9.

If in the switch according to FIGURES 9 to 11 spring 62 consists of bimetal and the compensating resistance 65 forms a heating coil around this bimetallic spring 62, this spring will cooperate with the main bimetallic strip 6 when the latter through bracket 71, 72 disengages the contact 63 from contact 64 and thereby connects the compensating resistance 65 so as to function as a heating coil. The bimetallic spring 62 will then be heated by heating coil 65 and also bend in a counterclockwise direction, thereby relieving its restraining load on bimetallic strip 6.

By the reduction of the heating current by the compensating resistance 65, which, however, is not energized until the bimetallic strip 6 has reached a certain temperature and has become bent, the advantage will be attained that contact 12 on the bimetallic strip will always engage with spring contact 14 after almost the same delay, regardless of the size of the distance between these two contacts and regardless of the height of the temperature of the bimetallic strip 6 at the moment when the motor is switched on by the main switch.

This is true for the following reason: If the bimetallic strip 6 is cold at the beginning of the switching operation, it will be heated up and bent very quickly by being subjected to the full heat output so that it will quickly engage with the stop member 72 on bracket 71. The further bending action of the bimetallic strip 6 will then proceed more slowly because of the reduction of the heat output caused by the connection of the compensating resistance 65.

If, however, at the beginning of the switching operation, the bimetallic strip 6 is still warm from the preceding operation, the distance between the bimetallic strip 6 and stop member 72 on bracket 71 will be either very small or zero. In the first case therefore, the full heat output of heating coil 9 will cause a quick bending and engagement of bimetallic strip 6 with stop member 72, while in the latter case, because of the connection of compensating coil 65, there will only be a reduced heat output which causes a slower bending of the bimetallic strip until the engagement of its contact 12 with the opposite contact 14.

The compensating resistance 65 will therefore act at such a time like a brake upon the bimetallic strip 6. If, however, the compensating resistance is short-circuited, the bimetallic strip will bend very quickly. The switching operation will therefore proceed for all practical purposes just as quickly whether the bimetallic strip is in a cold or preheated condition. If the compensating resistance is connected, the bimetallic strip will continue to bend more slowly. This slow bending action of the bimetallic strip until its contact 12 engages with the opposite contact 14 will always be the same regardless of whether the bimetallic strip 6 was cold at the beginning of the switching operation or whether it was preheated from the preceding operation. This means that the electric motor will always have an adequate and predetermined time available for the starting operation so that no interference or breakdown will occur and a proper operation of the motor will be ensured even though it is switched on and off very frequently.

The switch according to FIGURES 1 to 8 as well as the switch according to FIGURES 9 to 11 may also be used as a starting switch for induction motors in connection with an overload protective switch, and be mounted together with the latter in a common housing so as to form a single unit which may be easily installed.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A switch comprising, in combination: a bimetallic strip carrying a movable contact; a heating coil for heating said strip, said heating coil being connectible to an external circuit; an opposite contact normally spaced from and adapted to be engaged by said movable contact when said strip is heated due to current flowing through said heating coil and is thereby bent; and a relay incorporating a coil connected in series with said movable contact and said opposite contacts, an armature responding to excitation of said relay coil, a pair of operating contacts which are also connectible to the external circuit, and a pair of relay holding contacts connected in parallel with said movable and said opposite contacts, both said pairs of contacts being controlled by said armature.

2. A switch as defined in claim 1, wherein one contact of the pair of operaing contacts is secured to said relay armature.

3. A switch as defined in claim 1, wherein one contact of said pair of holding contacts is secured to said relay armature.

4. A switch as defined in claim 1, wherein said relay armature is pivotably connected by a spring to a ferromagnetic jacket surrounding said coil of said relay.

5. A switch as defined in claim 1, further comprising a spring, said opposite contact being secured to said spring, and means for adjusting said spring.

6. A switch as defined in claim 5, wherein said adjusting means comprise a setscrew having a conical portion engaging with said spring.

7. A switch as defined in claim 5, wherein said spring is a bimetallic plate spring.

8. A switch as defined in claim 1, wherein said bimetallic strip is secured directly to a ferromagnetic jacket surrounding said coil of said relay.

9. A switch as defined in claim 1, further comprising a compensating resistance for said heating coil, and means for short-circuiting said compensating resistance so long as said contact carried by said bimetallic strip is spaced at least a predetermined distance from said opposite contact.

10. A switch as defined in claim 9, wherein said short-circuiting means comprise a spring and a pair of short-circuiting contacts, one of said contacts being mounted on said spring, said spring being disposed relative to said bimetallic strip so as to be bent by said strip when said strip is bent by heat from said heating coil but said contact carried by said bimetallic strip is spaced at least said predetermined distance from said opposite contact.

11. A switch as defined in claim 10, further comprising a carrier member for connecting said bimetallic strip to said spring when said contact carried by said bimetallic strip is spaced said predetermined distance from said opposite contact.

12. A switch as defined in claim 11, wherein said carrier member is secured to said spring.

13. A switch as defined in claim 12, wherein said carrier member comprises a stop member adjustable relative to said bimetallic strip.

14. A switch as defined in claim 12, wherein said carrier member comprises a stop member, and means for adjusting said stop member to a certain distance from said bimetallic strip when said strip is in a cold condition.

15. A switch as defined in claim 10, wherein said compensating resistance is wound around said spring, one end of said heating coil being connected to the contact on said spring.

16. A switch as defined in claim 15, wherein said spring is a bimetallic plate spring and said compensating resistance forms a heating coil for heating said bimetallic spring.

17. A switch as defined in claim 1, further comprising signal contacts, and means on said armature for opening and closing said contacts in accordance with the position of said armature.

18. A switch as defined in claim 17, wherein said means comprise a bridge member connected to said armature for shunting said signal contacts.

19. A switch as defined in claim 1, further comprising a two-part housing enclosing all of the elements of said switch, and terminal strips for connecting said elements to a source of current and to said motor, respectively, and being disposed within and extending from the joint between said housing parts.

20. A switch as defined in claim 19, wherein three terminal strips are provided, one of which is connected to said bimetallic strip and the second to one end of said relay coil.

21. A switch as defined in claim 19, wherein at least one of said housing parts has a plurality of recesses and apertures therein into which the various switch elements may be inserted and in which they will be held in a fixed position by the other housing part when the latter is applied upon and secured to said first housing part.

References Cited in the file of this patent

UNITED STATES PATENTS

| | | |
|---|---|---|
| 1,922,452 | Parks | Aug. 15, 1933 |
| 2,521,120 | Harold | Sept. 5, 1950 |
| 2,801,312 | Clark | July 30, 1957 |
| 2,980,779 | Hickle et al. | Apr. 18, 1961 |